US012759838B2

(12) United States Patent
Izawa et al.

(10) Patent No.: US 12,759,838 B2
(45) Date of Patent: Oct. 13, 2026

(54) ELEVATOR CONTROL APPARATUS, ELEVATOR CONTROL METHOD, AND COMPUTER READABLE MEDIUM

(71) Applicant: Mitsubishi Electric Corporation, Tokyo (JP)

(72) Inventors: Tetsumi Izawa, Tokyo (JP); So Minaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1029 days.

(21) Appl. No.: 17/956,011

(22) Filed: Sep. 29, 2022

(65) Prior Publication Data

US 2023/0028432 A1 Jan. 26, 2023

Related U.S. Application Data

(63) Continuation of application No. PCT/JP2020/020684, filed on May 26, 2020.

(51) Int. Cl.

*B66B 1/52* (2006.01)
*B66B 1/24* (2006.01)
*B66B 1/34* (2006.01)

(52) U.S. Cl.

CPC .............. *B66B 1/52* (2013.01); *B66B 1/2408* (2013.01); *B66B 1/3423* (2013.01); *B66B 2201/104* (2013.01); *B66B 2201/22* (2013.01)

(58) Field of Classification Search

CPC ....... B66B 1/52; B66B 1/2408; B66B 1/3423; B66B 2201/104; B66B 2201/22; B66B 2201/405; B66B 1/468; B66B 5/0012; B66B 1/14

See application file for complete search history.

(56) References Cited

U.S. PATENT DOCUMENTS 9,238,568 B2 * 1/2016 Nonami .................. B66B 1/468

FOREIGN PATENT DOCUMENTS

| | | |
|---|---|---|
| JP | 2009-93322 A | 4/2009 |
| JP | 2010-86358 A | 4/2010 |
| JP | 2010-191677 A | 9/2010 |
| JP | 2011-92307 A | 5/2011 |

(Continued)

OTHER PUBLICATIONS

Extended European Search Report issued in Application No. EP 20937615.1, dated Apr. 11, 2023.

(Continued)

*Primary Examiner* — Bickey Dhakal
(74) *Attorney, Agent, or Firm* — Birch, Stewart, Kolasch & Birch, LLP

(57) ABSTRACT

An exercise necessity degree determination unit (13) determines an exercise necessity degree being a degree to which an elevator user needs to exercise, who uses an elevator (50) provided in a building provided with an inter-floor travel means other than the elevator. A floor decision unit (14) changes based on the exercise necessity degree of the elevator user determined by the exercise necessity degree determination unit (13), at least one of a boarding floor and an alighting floor of the elevator (50) from a floor that the elevator user prefers to another floor so as to let the elevator user use the inter-floor travel means before the elevator user reaches a destination floor to which the elevator user intends to go.

9 Claims, 10 Drawing Sheets

(56) References Cited

FOREIGN PATENT DOCUMENTS

| | | | | | |
|---|---|---|---|---|---|
| JP | 2013-70844 | A | | 4/2013 | |
| JP | 2013-143004 | A | | 7/2013 | |
| JP | 5684468 | B2 | | 3/2015 | |
| JP | 5694206 | B2 | | 4/2015 | |
| JP | 5704341 | B2 | | 4/2015 | |
| JP | 2015-157029 | A | | 9/2015 | |
| JP | 6247956 | B2 | | 12/2017 | |
| JP | 6364366 | B2 | | 7/2018 | |
| JP | 2019-114145 | A | | 7/2019 | |
| WO | WO 2017/144384 | A1 | | 8/2017 | |
| WO | WO-2017146567 | A1 | * | 8/2017 | ............... B66B 9/08 |

OTHER PUBLICATIONS

International Search Report (PCT/ISA/210) issued in PCT/JP2020/020684, dated Aug. 4, 2020.

Written Opinion of the International Searching Authority (PCT/ISA/237) issued in PCT/JP2020/020684, dated Aug. 4, 2020.

* cited by examiner

Fig. 5

| EXERCISE NECESSITY DEGREE | STAIRS-USAGE FLOOR NUMBER |
| --- | --- |
| 3 | 2 up/3 down |
| 2 | 2 up/2 down |
| 1 | 1 up/2 down |
| 0 | NO USE OF STAIRS |

Fig. 9

USER ID: AAA

| COMBINATION NUMBER | BORDING FLOOR | ALIGHTING FLOOR | NUMBER OF TIMES OF APPROVALS | NUMBER OF TIMES OF DISAPPROVALS | NUMBER OF TIMES OF UPDATES |
|---|---|---|---|---|---|
| 1 | 1F | 7F | 0 | 0 | 10 |
| 2 | 1F | 6F | 5 | 3 | 2 |
| 3 | 1F | 5F | 4 | 5 | 1 |
| 4 | 2F | 6F | 2 | 8 | 0 |
| ... | ... | ... | ... | ... | ... |

Fig.10
START
S401
IS USER PRESENT?
NO
YES
S402
IS USER ALONE?
NO
YES
S403
CARRY OUT USUAL PROCEDURE
S404
IDENTIFY USER
S421
IS THERE ACCEPTANCE RECORD INFORMATION ?
NO
YES
S405 to S408
S422
DECIDE BORDING FLOOR AND ALIGHTING FLOOR BASED ON ACCEPTANCE RECORD
S409
HAS CHANGE REQUEST BEEN MADE ?
NO
YES
S410
UPDATE BORDING FLOOR AND/OR ALIGHTING FLOOR
S423
REGISTER RECORD INFORMATION
S411
OPERATE ELEVATOR
END

ELEVATOR CONTROL APPARATUS, ELEVATOR CONTROL METHOD, AND COMPUTER READABLE MEDIUM

CROSS REFERENCE TO RELATED APPLICATIONS

This application is a Continuation of PCT International Application No. PCT/JP2020/020684, filed on May 26, 2020, which is hereby expressly incorporated by reference into the present application.

TECHNICAL FIELD

The present disclosure relates to travel of an elevator.

BACKGROUND ART

There is a technology to encourage elevator users to use stairs and promote exercise among the elevator users (for example, Patent Literature 1).

Patent Literature 1 discloses a technology for determining whether or not an elevator user is an able-bodied person and encouraging the use of stairs if the elevator user is an able-bodied person.

CITATION LIST

Patent Literature

Patent Literature 1: JP 6364366 B2

SUMMARY OF INVENTION

Technical Problem

The technology of Patent Literature 1 is intended to promote exercise among the elevator users, but the degree to which the exercise is required differs for each elevator user. Therefore, it is desirable to adjust the number of floors for which the stairs are used depending on the necessity degree of exercise of the elevator user.

However, the technology of Patent Literature 1 has a problem in that the number of floors for the elevator user to use the stairs is fixed (for example, single floor travel) and in that it is not feasible to adjust the number of floors for which the stairs are used and the direction to which the stairs are used depending on the necessity degree of exercise of the elevator user.

The present disclosure mainly aims to solve the above-described problem. More specifically, the present disclosure mainly aims to adjust the number of floors for which an inter-floor travel means such as stairs is used and the direction to which the inter-floor travel means is used depending on the necessity degree of exercise of an elevator user.

Solution to Problem

An elevator control apparatus according to the present disclosure includes:

an exercise necessity degree determination unit to determine an exercise necessity degree being a degree to which an elevator user needs to exercise, who uses an elevator provided in a building provided with an inter-floor travel means other than the elevator; and a floor decision unit to change based on the exercise necessity degree of the elevator user determined by the exercise necessity degree determination unit, at least one of a boarding floor and an alighting floor of the elevator from a floor that the elevator user prefers to another floor so as to let the elevator user use the inter-floor travel means before the elevator user reaches a destination floor to which the elevator user intends to go.

Advantageous Effects of Invention

According to the present disclosure, it is possible to adjust the number of floors for which an inter-floor travel means is used and the direction to which the inter-floor travel means is used depending on the necessity degree of exercise of an elevator user.

BRIEF DESCRIPTION OF DRAWINGS

FIG. 5 is a diagram illustrating an example of stairs-usage floor number information according to the first embodiment.

FIG. 9 is a diagram illustrating an example of acceptance record information according to the second embodiment.

DESCRIPTION OF EMBODIMENTS

Figure 1:
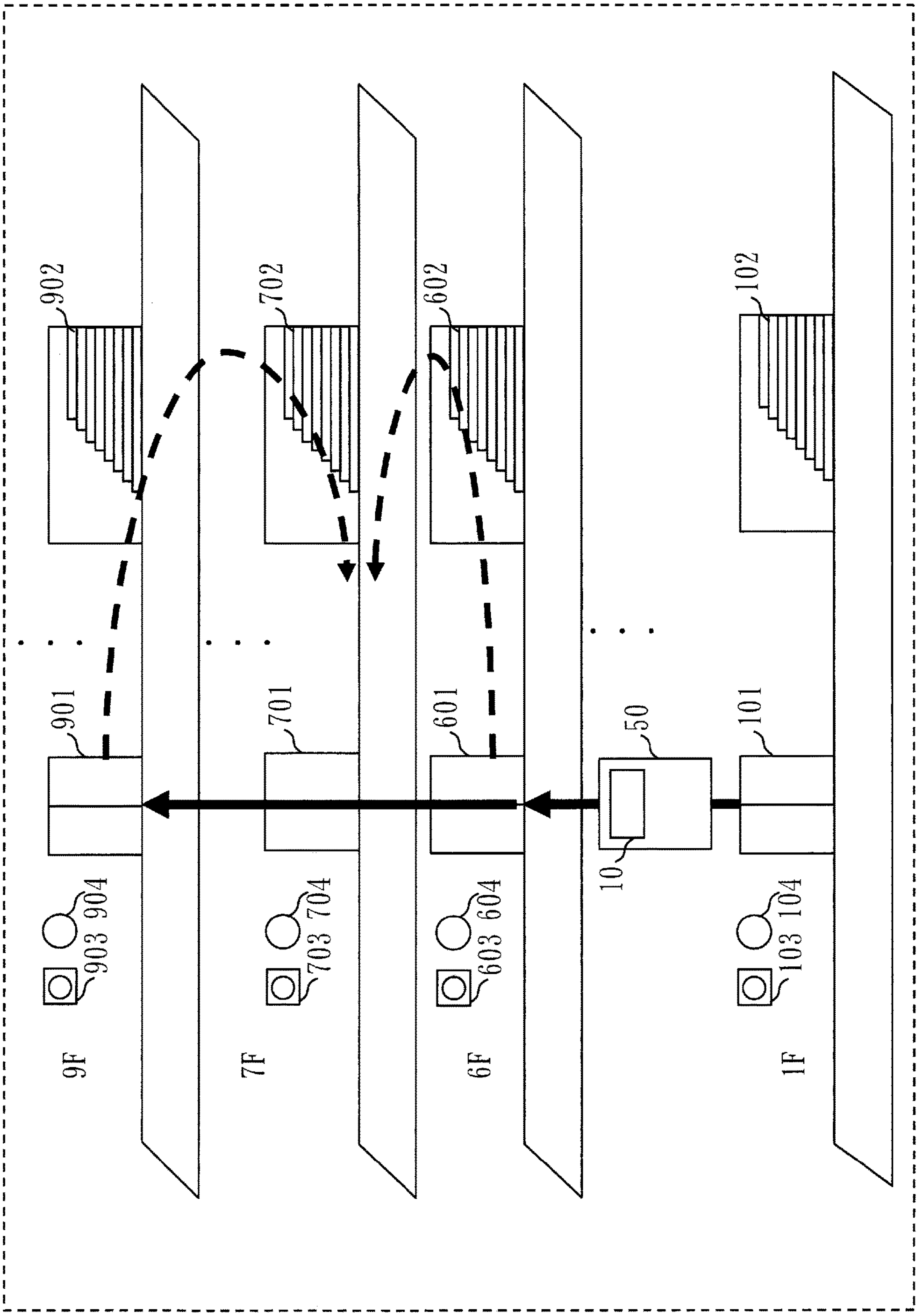
FIG. 1 is a diagram illustrating a configuration example of an elevator system according to a first embodiment.

Hereinafter, embodiments will be described with reference to the drawings. In the following description of the embodiments and the drawings, parts assigned the same reference numerals indicate the same parts or corresponding parts.

First Embodiment

*Description of Configuration*

FIG. 1 illustrates a configuration example of an elevator system according to the present embodiment.

In the present embodiment, an elevator system will be described, which is provided in a building provided with stairs as an inter-floor travel means other than an elevator. The inter-floor travel means is a means provided to let a user travel between floors. As the inter-floor travel means, a slope, an escalator, and the like are considered in addition to the stairs. In the present embodiment, the stairs will be described as an example of the inter-floor travel means.

In the present embodiment, it is assumed that the building is a ten-story building.

An elevator 50 travels from a first floor to a tenth floor of the building. Further, an elevator control apparatus 10 is installed in the elevator 50. The elevator control apparatus 10 controls travel of the elevator 50.

For depiction convenience, FIG. 1 illustrates only the first floor, a sixth floor, a seventh floor, and a ninth floor.

On the first floor, there are a door 101, stairs 102, a surveillance camera 103, and a beacon 104.

The door 101 remains closed before the elevator 50 arrives at the first floor. When the elevator 50 arrives at the first floor, the door 101 opens.

The stairs 102 are stairs for ascending to a second floor.

The surveillance camera 103 captures an elevator user (hereinafter, simply referred to as a user) who is on the first floor. The beacon 104 communicates with a mobile terminal device (for example, a smart phone) held by the elevator user on the first floor.

Also on the sixth floor, the seventh floor, and the ninth floor, there are a door 601, a door 701, and a door 901, respectively. Each of the door 601, the door 701, and the door 901 is the same as the door 101.

Further, also on the sixth floor, the seventh floor, and the ninth floor, there are stairs 602, stairs 702, and stairs 902, respectively. The stairs 602 are stairs for descending to a fifth floor and for ascending to the seventh floor. The stairs 702 are stairs for descending to the sixth floor and for ascending to an eighth floor. The stairs 902 are stairs for descending to the eighth floor and for ascending to the tenth floor.

Also on the sixth floor, the seventh floor, and the ninth floor, there are a surveillance camera 603, a surveillance camera 703, and a surveillance camera 903, respectively. Each of the surveillance camera 603, the surveillance camera 703, and the surveillance camera 903 is the same as the surveillance camera 103.

Also on the sixth floor, the seventh floor, and the ninth floor, there are a beacon 604, a beacon 704, and a beacon 904, respectively. Each of the beacon 604, the beacon 704, and the beacon 904 is the same as the beacon 104.

An outline of operation of the elevator control apparatus 10 according to the present embodiment will be described hereinafter.

The elevator control apparatus 10 determines the exercise necessity degree of the elevator user. The exercise necessity degree is a degree to which the elevator user needs to exercise. The elevator control apparatus 10, for example, determines the exercise necessity degree based on the activity amount of the elevator user.

Further, the elevator control apparatus 10 stores a stairs-usage floor number for each level of exercise necessity degree. For example, the stairs-usage floor number is expressed like "1 up/2 down". "Up" represents the maximum number of ascending floors which is the maximum number of floors to let the elevator user ascend the stairs. "Down" represents the maximum number of descending floors which is the maximum number of floors to let the elevator user descend the stairs. "1 up/2 down" means that the maximum number of ascending floors is 1 floor and the maximum number of descending floors is 2 floors.

Then, the elevator control apparatus 10 changes based on the exercise necessity degree of the elevator user, at least one of the boarding floor and the alighting floor of the elevator from a floor that the elevator user prefers to another floor so as to let the elevator user use the stairs before the elevator user reaches a destination floor to which the elevator user intends to go. More specifically, the elevator control apparatus 10 changes at least one of the boarding floor and the alighting floor within the range of the stairs-usage floor number corresponding to the exercise necessity degree of the elevator user.

For example, it is assumed that there is an elevator user on the first floor and the destination floor to which the elevator user intends to go is the seventh floor. Further, it is assumed that the stairs-usage floor number corresponding to the exercise necessity degree of the elevator user is "1 up/2 down".

In this case, based on "1 up/2 down" which is the stairs-usage floor number and the seventh floor which is the destination floor, the elevator control apparatus 10 changes either the boarding floor or the alighting floor.

For example, the elevator control apparatus 10 keeps the boarding floor as the first floor and changes the alighting floor to the sixth floor. The elevator user who has gotten off the elevator 50 on the sixth floor uses the stairs to the seventh floor. In this case, the condition of "1 up" is satisfied.

Further, the elevator control apparatus 10 keeps the boarding floor as the first floor and may change the alighting floor to the ninth floor. The elevator user who has gotten off the elevator 50 on the ninth floor uses the stairs to the seventh floor. In this case, the condition of "2 down" is satisfied.

Figure 2:
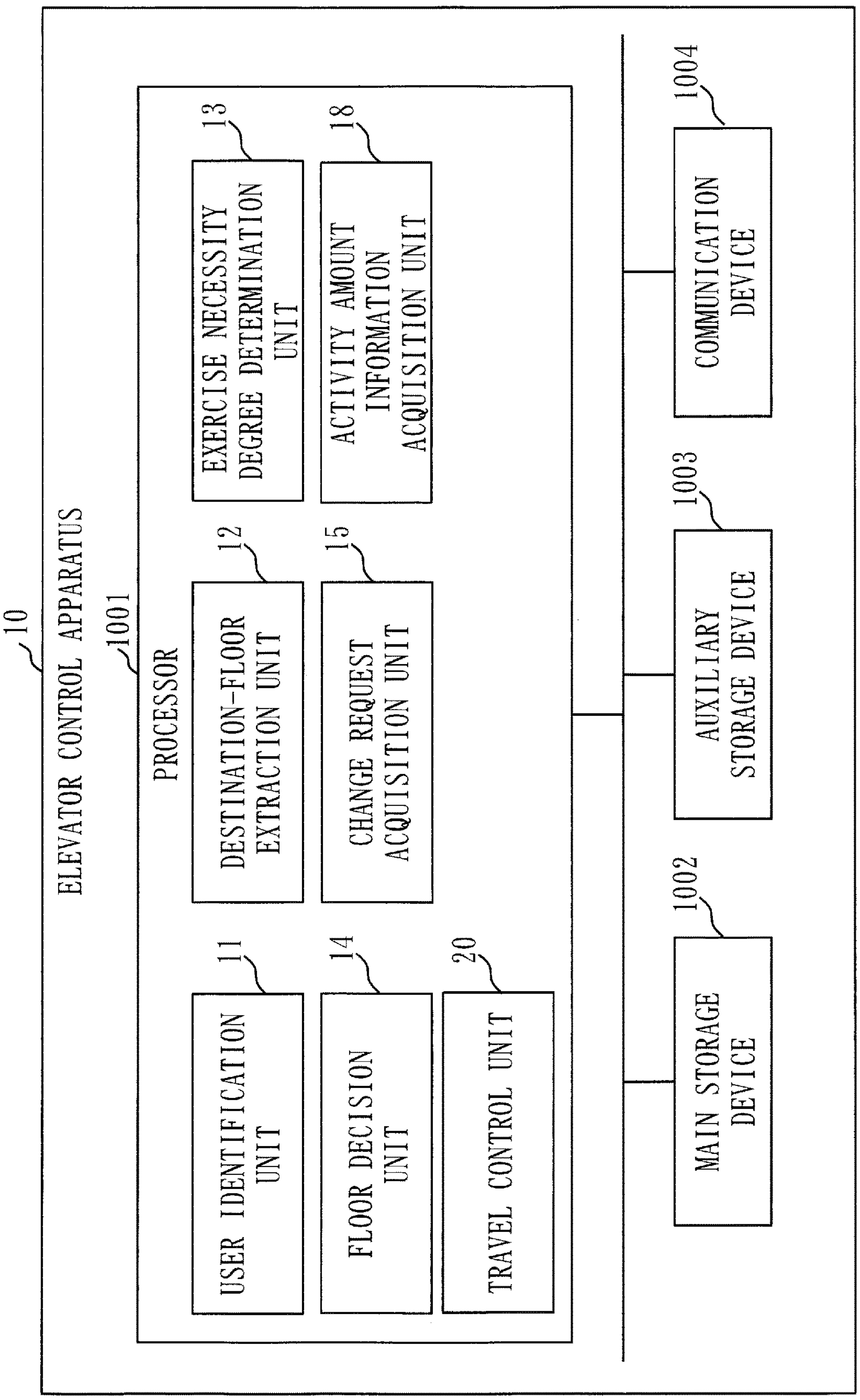
FIG. 2 is a diagram illustrating a hardware configuration example of an elevator control apparatus according to the first embodiment.

FIG. 2 illustrates a hardware configuration example of the elevator control apparatus 10 according to the present embodiment.

Figure 3:
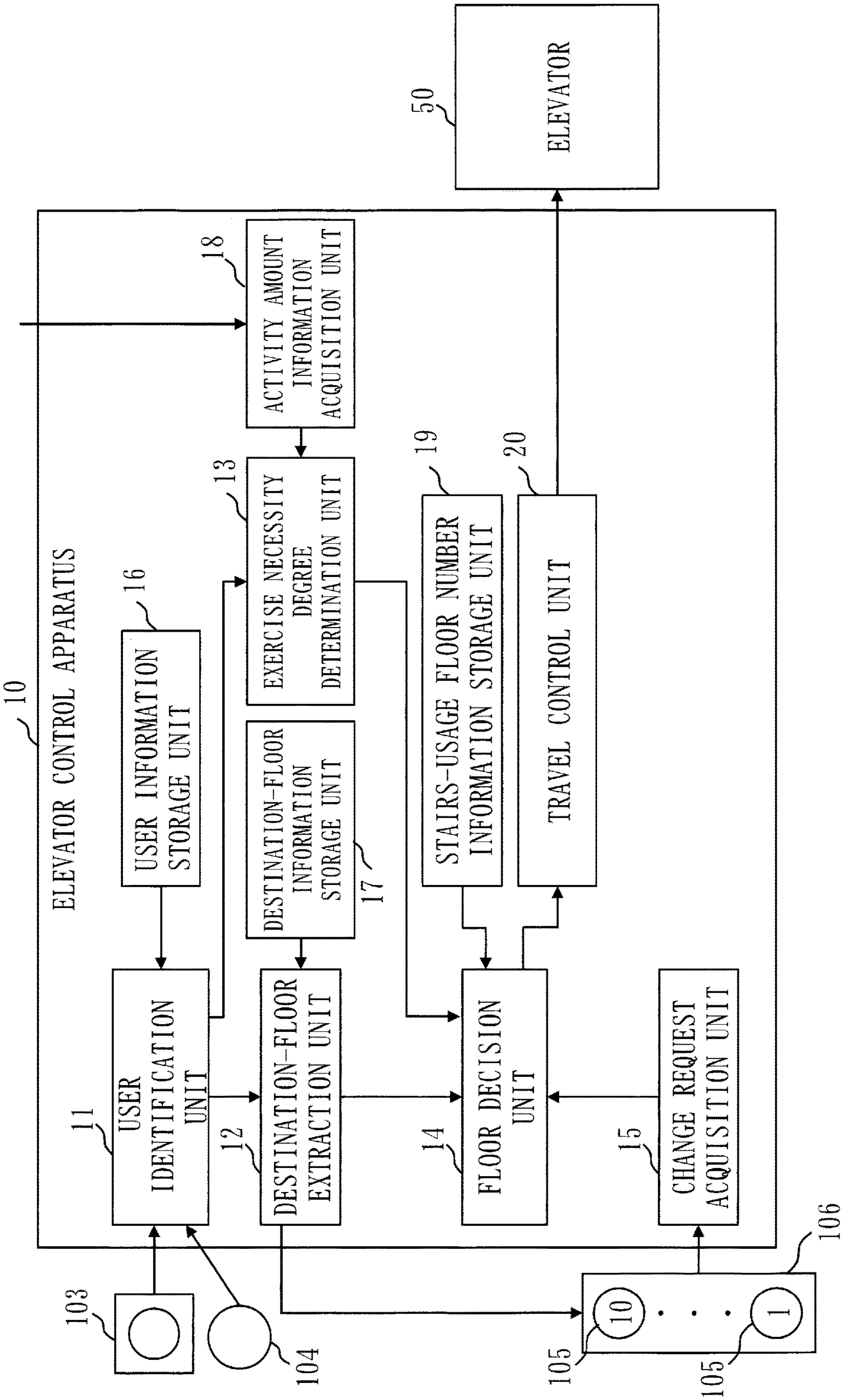
FIG. 3 is a diagram illustrating a functional configuration example of the elevator control apparatus according to the first embodiment.

FIG. 3 illustrates a functional configuration example of the elevator control apparatus 10 according to the present embodiment.

The elevator control apparatus 10 is a computer. The operation procedure of the elevator control apparatus 10 is equivalent to an elevator control method. Further, a program which realizes operations of the elevator control apparatus 10 is equivalent to an elevator control program.

The elevator control apparatus 10 includes a processor 1001, a main storage device 1002, an auxiliary storage device 1003, and a communication device 1004, as pieces of hardware.

Further, the elevator control apparatus 10 includes a user identification unit 11, a destination-floor extraction unit 12, an exercise necessity degree determination unit 13, a floor decision unit 14, a change request acquisition unit 15, a user information storage unit 16, a destination-floor information storage unit 17, an activity amount information acquisition unit 18, a stairs-usage floor number information storage unit 19, and a travel control unit 20, as a functional configuration.

The auxiliary storage device 1003 stores programs which realize functions of the user identification unit 11, the destination-floor extraction unit 12, the exercise necessity degree determination unit 13, the floor decision unit 14, the change request acquisition unit 15, the activity amount information acquisition unit 18, and the travel control unit 20.

These programs are loaded from the auxiliary storage device 1003 into the main storage device 1002. Then, the processor 1001 executes these programs and performs operations of the user identification unit 11, the destination-floor extraction unit 12, the exercise necessity degree determination unit 13, the floor decision unit 14, the change request acquisition unit 15, the activity amount information acquisition unit 18, and the travel control unit 20 to be described below.

FIG. 2 schematically illustrates a state where the processor 1001 executes the programs which realize the functions of the user identification unit 11, the destination-floor extraction unit 12, the exercise necessity degree determination unit 13, the floor decision unit 14, the change request acquisition unit 15, the activity amount information acquisition unit 18, and the travel control unit 20.

The user information storage unit 16, the destination-floor information storage unit 17, and the stairs-usage floor number information storage unit 19 are realized by the main storage device 1002 or the auxiliary storage device 1003.

In FIG. 3, the user identification unit 11 identifies the elevator user.

The user identification unit 11, for example, acquires from the surveillance camera 103, a face image of the elevator user captured by the surveillance camera 103. Further, the user identification unit 11 acquires user information from the user information storage unit 16. The user information stores identification information for identifying the elevator user (for example, the face image and a telephone number).

Then, the user identification unit 11 identifies the elevator user by collating the face image of the elevator user with the user information. Further, the user identification unit 11 identifies the floor on which the surveillance camera 103 that has acquired the face image of the elevator user is placed (the first floor) as the floor on which the elevator user is currently located.

FIG. 3 illustrates an example in which the user identification unit 11 acquires the face image of the elevator user from the surveillance camera 103 placed on the first floor. However, the user identification unit 11 may also acquire the face image of the elevator user from a surveillance camera on another floor.

Further, the user identification unit 11, for example, acquires form a mobile terminal device (for example, a smart phone), an identifier of the beacon 104 acquired by the mobile terminal device and an identifier of the mobile terminal device (for example, a telephone number). Then, the user identification unit 11 identifies the elevator user by collating the identifier of the mobile terminal device of the elevator user with the user information. Further, the user identification unit 11 identifies the floor on which the elevator user is currently located (for example, the first floor) with using the identifier of the beacon 104.

The user identification unit 11 notifies the destination-floor extraction unit 12 of the identified elevator user. Further, the user identification unit 11 notifies the destination-floor extraction unit 12 and the exercise necessity degree determination unit 13 of the floor on which the elevator user is currently located (for example, the first floor).

The destination-floor extraction unit 12 extracts the destination floor to which the elevator user notified of by the user identification unit 11 intends to go.

The destination-floor extraction unit 12 acquires destination floor information from the destination-floor information storage unit 17. The destination floor information indicates the destination floor for each elevator user. In the present embodiment, the elevator user is assumed to perform routine travel. That is, in the present embodiment, the elevator user is assumed to routinely travel between the floor on which the entrance and exit of the building is located (for example, the first floor) and the floor on which an office where the elevator user works at is located (for example, the seventh floor). Therefore, the floor on which the entrance and the exit of the building is located (for example, the first floor) and the floor on which the office where the elevator user works at is located (for example, the seventh floor) are described in the destination floor information as destination floors. When the elevator user does not perform the routine travel, the destination-floor extraction unit 12 acquires the destination floor information from a floor display 105 to be described below. In the following, an example in which the elevator user performs the routine travel will be described.

The destination-floor extraction unit 12 extracts by referring to the destination floor information, the destination floor to which the elevator user notified of by the user identification unit 11 intends to go.

The destination-floor extraction unit 12 notifies the floor decision unit 14 of the floor on which the elevator user is currently located and the destination floor to which the elevator user intends to go. The floor on which the elevator user is currently located and the destination floor to which the elevator user intends to go are the boarding floor and the alighting floor that the elevator user prefers.

The exercise necessity degree determination unit 13 determines the exercise necessity degree of the elevator user notified of by the user identification unit 11.

Specifically, the exercise necessity degree determination unit 13 acquires from the activity amount information acquisition unit 18, activity amount information of the elevator user notified of by the user identification unit 11. The activity amount information indicates the activity amount of the elevator user. The activity amount is, for example, an energy consumption, the number of steps, or the like.

Then, the exercise necessity degree determination unit 13 determines the exercise necessity degree based on the activity amount of the elevator user.

In the present embodiment, it is assumed that the exercise necessity degree determination unit 13 determines the exercise necessity degree on four levels from 0 to 3. It is assumed that the exercise necessity degree: 0 is the lowest necessity degree of exercise and the exercise necessity degree: 3 is the highest necessity degree of exercise.

The exercise necessity degree determination unit 13 notifies the floor decision unit 14 of the determined exercise necessity degree.

The process performed by the exercise necessity degree determination unit 13 is equivalent to an exercise necessity degree determination process.

The floor decision unit 14 decides the boarding floor and the alighting floor for the elevator user.

Specifically, the floor decision unit 14 acquires stairs-usage floor number information from the stairs-usage floor number information storage unit 19. Then, the floor decision unit 14 obtains the stairs-usage floor number by collating the exercise necessity degree with the stairs-usage floor number information.

FIG. 5 illustrates an example of the stairs-usage floor number information. The stairs-usage floor number information indicates the stairs-usage floor number for each exercise necessity degree.

The floor decision unit 14 extracts from the stairs-usage floor number information, the stairs-usage floor number corresponding to the exercise necessity degree of the elevator user notified of by the exercise necessity degree determination unit 13.

Then, the floor decision unit 14 changes at least one of the boarding floor and the alighting floor of the elevator 50 within the range of the extracted stairs-usage floor number, from a floor that the elevator user prefers to another floor so as to let the elevator user use the stairs before reaching the destination floor.

As is evident from FIG. 5, the floor decision unit 14 changes at least one of the boarding floor and the alighting floor from the floor that the elevator user prefers to another floor so as to let the elevator user with the higher exercise necessity degree use stairs more.

The floor decision unit 14, for example, notifies the elevator user of the changed boarding floor and/or the changed alighting floor by lighting up the floor display 105 corresponding to the decided boarding floor and alighting floor among the floor display 105 included in an information board 106 provided at an elevator platform. For example, as explained with using FIG. 1, when the floor decision unit 14 changes the alighting floor from the seventh floor to the sixth floor, the floor decision unit 14 lights up the floor display 105 corresponding to the sixth floor. The floor decision unit 14 may notify the elevator user of the changed boarding floor and/or the changed alighting floor in other ways.

Further, the destination-floor extraction unit 12 notifies the user information storage unit 16 of the decided boarding floor and alighting floor.

Further, when the elevator user requests to change at least one of the boarding floor and the alighting floor to the floor that the elevator user prefers, the floor decision unit 14 changes at least one of the boarding floor and the alighting floor to the floor that the elevator user prefers.

The process performed by the floor decision unit 14 is equivalent to a floor decision process.

The change request acquisition unit 15 acquires from the elevator user, a change request to change at least one of the boarding floor and the alighting floor. That is, when the elevator user does not accept at least one of the boarding floor and the alighting floor decided by the floor decision unit 14, the elevator user requests to change at least one of the boarding floor and the alighting floor. The change request acquisition unit 15 acquires such change requests. The elevator user, for example, presses the floor display 105 corresponding to the requested boarding floor and/or alighting floor. For example, as explained with using FIG. 1, when the floor decision unit 14 changes the alighting floor from the seventh floor to the sixth floor and the elevator user does not accept the sixth floor, the elevator user presses the floor display 105 corresponding to the seventh floor. The change request acquisition unit 15 acquires the change request to the seventh floor by a press on the floor display 105 corresponding to the seventh floor.

The change request acquisition unit 15 outputs the change request to the floor decision unit 14.

The user information storage unit 16 sores the user information described above.

The destination-floor information storage unit 17 stores the destination floor information described above.

The activity amount information acquisition unit 18 acquires the activity amount information.

The activity amount information acquisition unit 18 acquires from a mobile terminal device (for example, a smart phone), the activity amount information indicating, for example, an energy consumption of the elevator user. Further, when the building is provided with an activity amount estimation system to estimate the activity amount of the elevator user, the activity amount information acquisition unit 18 may acquire the activity amount information indicating the activity amount estimated by the activity amount estimation system.

The stairs-usage floor number information storage unit 19 stores the stairs-usage floor number information described above.

The travel control unit 20 controls the travel of the elevator 50 so as to stop the elevator 50 at the boarding floor and the alighting floor notified of by the floor decision unit 14.

*Description of Operation*

Figure 4:
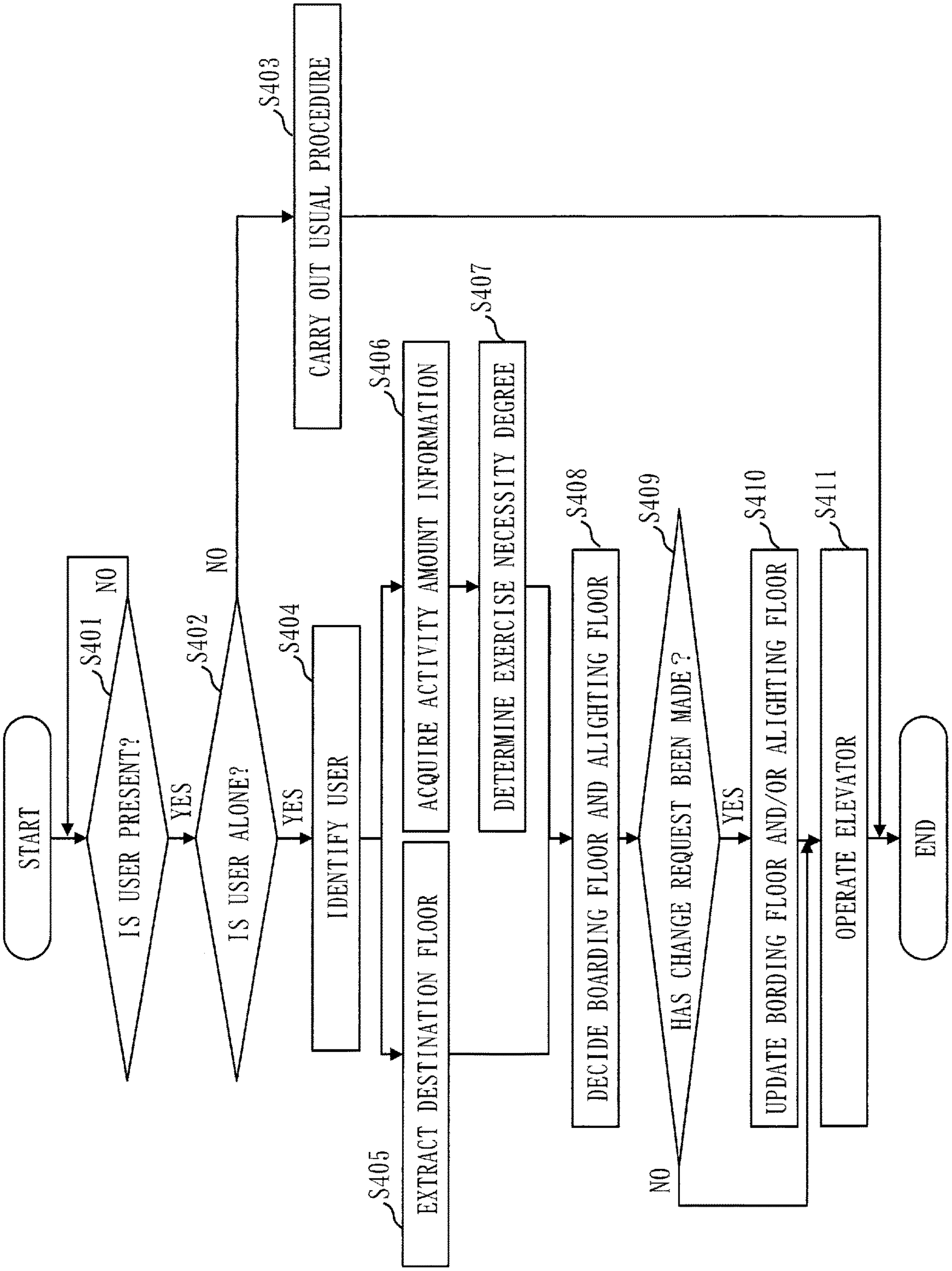
FIG. 4 is a flowchart illustrating an operation example of the elevator control apparatus according to the first embodiment.

FIG. 4 illustrates an operation example of the elevator control apparatus 10 according to the present embodiment.

Hereinafter, with reference to FIG. 4, the operation example of the elevator control apparatus 10 according to the present embodiment will be described.

First, in step S401, the user identification unit 11 determines whether or not the elevator user is present on any floor.

Specifically, when the user identification unit 11 acquires the face image of the elevator user from the surveillance camera on one of the floors, the user identification unit 11 determines that the elevator user is present. Alternatively, the user identification unit 11 may determine the presence of the elevator user when obtaining from the mobile terminal device, an identifier of a beacon on any floor.

When the user identification unit 11 determines that the elevator user is present, the process proceeds to step S402.

In step S402, the user identification unit 11 determines whether the user is alone or not.

Specifically, the user identification unit 11 determines that the user is alone when obtaining only one face image of the elevator user from the surveillance camera on the corresponding floor. Alternatively, the user identification unit 11 may determine that the user is alone when there is only one mobile terminal device that has sent the identifier of the beacon on the corresponding floor.

When there are several users, the process proceeds to step S403.

On the other hand, when the user is alone, the process proceeds to step S404.

In step S403, the floor decision unit 14 decides the boarding floor and the alighting floor with the usual procedure.

That is, the user identification unit 11 notifies the floor decision unit 14 that there are the several users, via the destination-floor extraction unit 12. Further, the user identification unit 11 notifies the floor decision unit 14 of the floor on which several elevator users are located (for example, the first floor), via the destination-floor extraction unit 12. The floor decision unit 14 decides the floor on which the several elevator users are located as the boarding floor. Then, the floor decision unit 14 notifies the travel control unit 20 of the boarding floor and the travel control unit 20 controls to direct the elevator 50 to the boarding floor. Further, when the elevator 50 reaches the boarding floor and a destination floor button in the elevator 50 is pressed by the elevator user, the floor decision unit 14 decides the floor on which the destination floor button is pressed as the alighting floor. Then, the floor decision unit 14 notifies the travel control unit 20 of the alighting floor and the travel control unit 20 controls to direct the elevator 50 to the alighting floor.

In step S404, the user identification unit 11 identifies the elevator user.

Specifically, the user identification unit 11 acquires the user information from the user information storage unit 16.

Then, when the face image of the elevator user has been acquired from the surveillance camera, the user identification unit 11 collates the face image of the elevator user with the user information and identifies the elevator user.

Alternatively, when the identifier of the beacon has been acquired from the mobile terminal device, the user identification unit 11 collates the identifier of the mobile terminal device with user identification information and identifies the elevator user.

The user identification unit 11 notifies the destination-floor extraction unit 12 of the elevator user. Further, the user identification unit 11 notifies the destination-floor extraction unit 12 and the exercise necessity degree determination unit 13 of the floor on which the elevator user is currently located (for example, the first floor). Hereinafter, the floor on which the elevator user is currently located is referred to as a location floor.

In step S405, the destination-floor extraction unit 12 extracts the destination floor.

Specifically, the destination-floor extraction unit 12 acquires the destination floor information from the destination-floor information storage unit 17.

Then, the destination-floor extraction unit 12 extracts the destination floor for the elevator user by collating the elevator user notified of by the user identification unit 11 with the destination floor information.

The destination-floor extraction unit 12 notifies the floor decision unit 14 of the extracted destination floor and location floor.

In step S406, the activity amount information acquisition unit 18 acquires the activity amount information from the mobile terminal device or the activity amount estimation system.

More specifically, the exercise necessity degree determination unit 13 notifies the activity amount information acquisition unit 18 of the location floor. Here, it is assumed that the location floor is the first floor. The activity amount information acquisition unit 18 acquires the activity amount information of the elevator user from the mobile terminal device on the first floor or the activity amount estimation system on the first floor. It is assumed that the mobile terminal device records the energy consumption, the number of steps, or the like of the elevator user as the activity amount.

The activity amount information acquisition unit 18 outputs the acquired activity amount information to the exercise necessity degree determination unit 13.

Next, in step S407, the exercise necessity degree determination unit 13 determines the exercise necessity degree of the elevator user based on the activity amount information.

For example, the exercise necessity degree determination unit 13 can determine the exercise necessity degree by an achievement degree toward a target value of the activity amount, the achievement degree being indicated in the acquired activity amount information. Any method may be used to determine the exercise necessity degree.

The exercise necessity degree determination unit 13 notifies the floor decision unit 14 of the exercise necessity degree.

Next, in step S408, the floor decision unit 14 decides the boarding floor and the alighting floor for the elevator user based on the exercise necessity degree.

More specifically, the floor decision unit 14 acquires the stairs-usage floor number information from the stairs-usage floor number information storage unit 19. Then, the floor decision unit 14 obtains the stairs-usage floor number by collating the exercise necessity degree with the stairs-usage floor number information.

Then, the floor decision unit 14 decides the boarding floor and the alighting floor that are compatible with the stairs-usage floor number, within an on-board section between the destination floor and the location floor notified of by the destination-floor extraction unit 12. When there are several combinations of the boarding floor and the alighting floor that are compatible with the stairs-usage floor number, the floor decision unit 14 selects any one combination from the several combinations.

Further, the floor decision unit 14 notifies the elevator user of the boarding floor and the alighting floor by lighting up the floor display 105 corresponding to the decided boarding floor and alighting floor.

Next, in step S409, the floor decision unit 14 determines whether or not the change request from the elevator user has been made within a certain period of time after the floor display 105 has been lightened up.

Specifically, when the change request is output from the change request acquisition unit 15, the floor decision unit 14 determines that the change request has been made.

When the change request has been made, the process proceeds to step S410.

On the other hand, when the change request has not been made, the floor decision unit 14 notifies the travel control unit 20 of the boarding floor and the alighting floor, then the process proceeds to step S411.

In step S410, the floor decision unit 14 updates the boarding floor and/or the alighting floor to the floor that the elevator user prefers in response to the change request.

When the floor decision unit 14 has changed the boarding floor to a floor other than the location floor and the elevator user prefers to change the boarding floor to the location floor, the floor decision unit 14 changes the boarding floor to the location floor that the elevator user prefers.

Similarly, when the floor decision unit 14 has changed the alighting floor to a floor other than the destination floor and the elevator user prefers to change the alighting floor to the destination floor, the floor decision unit 14 changes the alighting floor to the destination floor that the elevator user prefers.

Then, the floor decision unit 14 notifies the travel control unit 20 of the eventual boarding floor and alighting floor.

In step S411, the travel control unit 20 controls to direct the elevator 50 to the boarding floor. Further, the travel control unit 20 controls to direct the elevator 50 to the alighting floor.

Next, combination patterns of the boarding floor and the alighting floor are described with reference to FIG. 6 and FIG. 7.

Figure 6:
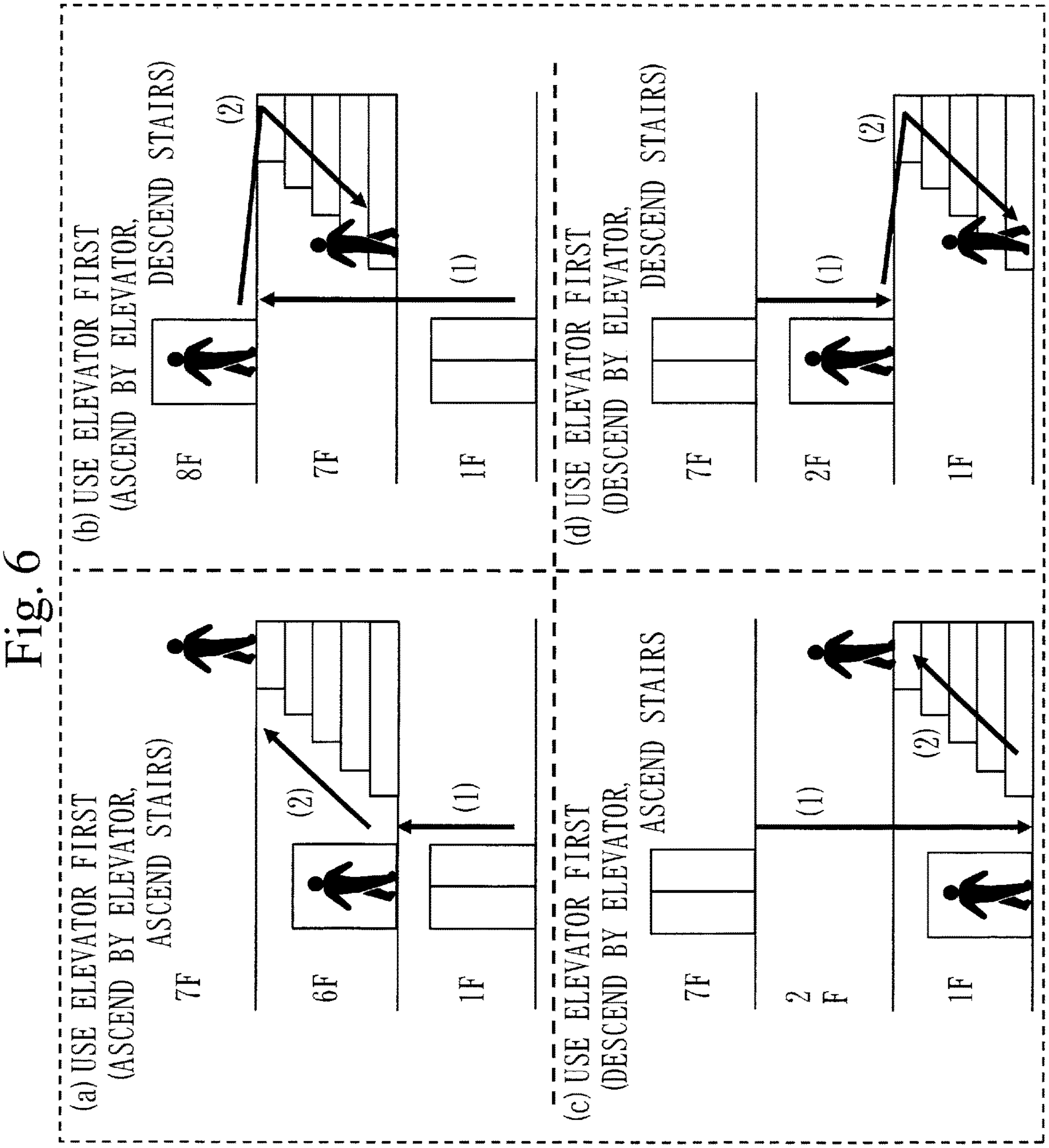
FIG. 6 is a diagram illustrating combination patterns of a boarding floor and an alighting floor according to the first embodiment.

FIG. 6 illustrates patterns using the elevator first.

Figure 7:
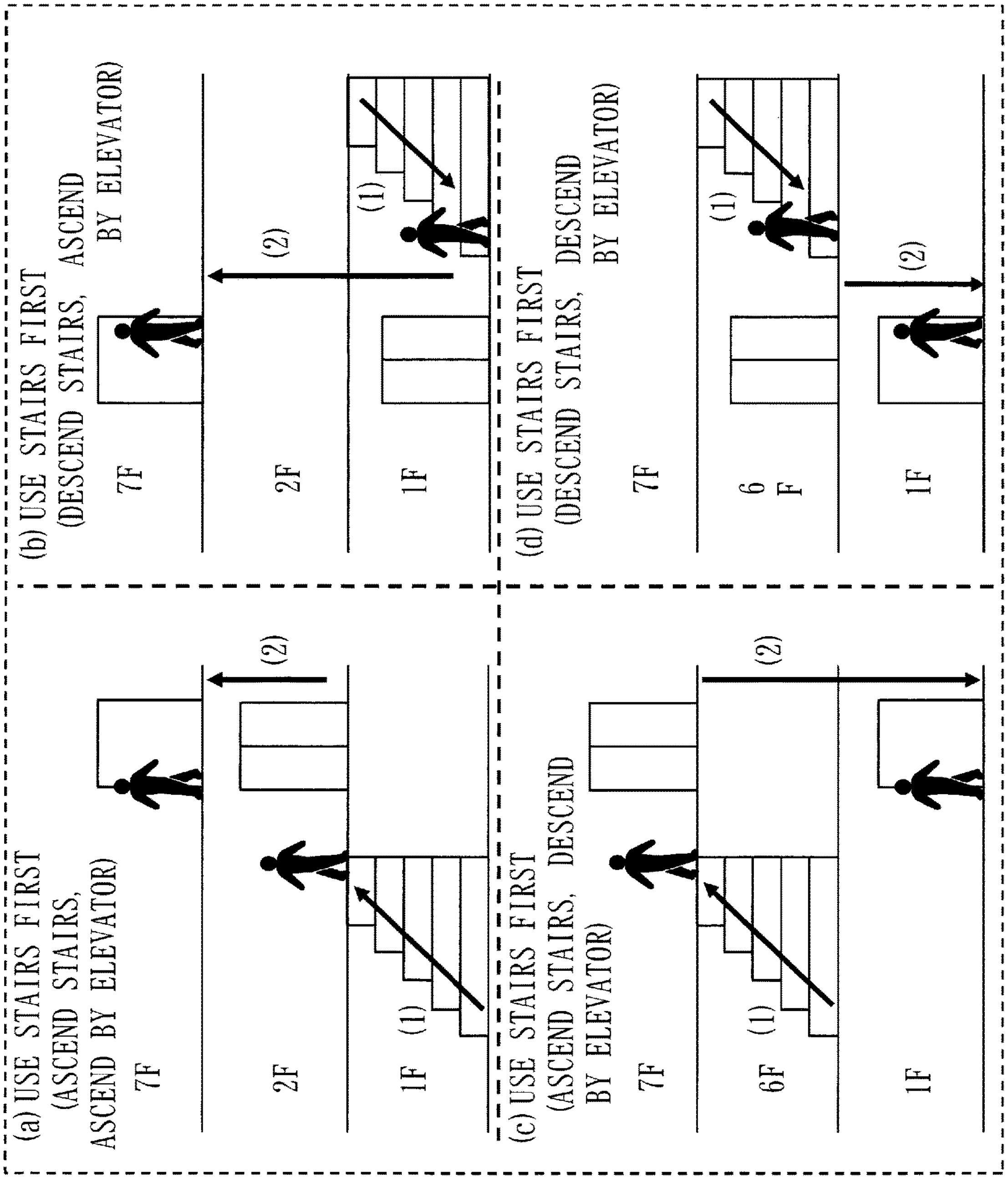
FIG. 7 is a diagram illustrating combination patterns of the boarding floor and the alighting floor according to the first embodiment.

FIG. 7 illustrates patterns using the stairs first.

Further, although it is not described in FIG. 5, the explanation will be given here using an example in which the stairs-usage floor number is “1 up/1 down” for simplifying the explanation.

FIG. 6 (*a*) illustrates a pattern of ascending by the elevator first and then ascending the stairs to reach the destination floor.

When the first floor is the location floor and the seventh floor is the destination floor, in the pattern of FIG. 6 (*a*), the floor decision unit 14 decides the first floor as the boarding floor and the sixth floor as the alighting floor (1 up).

FIG. 6 (*b*) illustrates a pattern of ascending by the elevator first and then descending the stairs to reach the destination floor.

When the first floor is the location floor and the seventh floor is the destination floor, in the pattern of FIG. 6 (*b*), the floor decision unit 14 decides the first floor as the boarding floor and the eighth floor as the alighting floor (1 down).

FIG. 6 (*c*) illustrates a pattern of descending by the elevator first and then ascending the stairs to reach the destination floor.

When the seventh floor is the location floor and the second floor is the destination floor, in the pattern of FIG. 6 (*c*), the floor decision unit 14 decides the seventh floor as the boarding floor and the first floor as the alighting floor (1 up).

FIG. 6 (*d*) illustrates a pattern of descending by the elevator first and then descending the stairs to reach the destination floor.

When the seventh floor is the location floor and the first floor is the destination floor, in the pattern of FIG. 6 (*d*), the floor decision unit 14 decides the seventh floor as the boarding floor and the second floor as the alighting floor (1 down).

FIG. 7 (*a*) illustrates a pattern of ascending the stairs first and then ascending by the elevator to reach the destination floor.

When the first floor is the location floor and the seventh floor is the destination floor, in the pattern of FIG. 7 (*a*), the floor decision unit 14 decides the second floor as the boarding floor (1 up) and the seventh floor as the alighting floor.

FIG. 7 (*b*) illustrates a pattern of descending the stairs first and then ascending by the elevator to reach the destination floor.

When the second floor is the location floor and the seventh floor is the destination floor, in the pattern of FIG. 7 (*b*), the floor decision unit 14 decides the first floor as the boarding floor (1 down) and the seventh floor as the alighting floor.

FIG. 7 (*c*) illustrates a pattern of ascending the stairs first and then descending by the elevator to reach the destination floor.

When the sixth floor is the location floor and the first floor is the destination floor, in the pattern of FIG. 7 (*c*), the floor decision unit 14 decides the seventh floor as the boarding floor (1 up) and the first floor as the alighting floor.

FIG. 7 (*d*) illustrates a pattern of descending the stairs first, and then descending by the elevator to reach the destination floor.

When the seventh floor is the location floor and the first floor is the destination floor, in the pattern of FIG. 7 (*d*), the floor decision unit 14 decides the sixth floor as the boarding floor (1 down) and the first floor as the alighting floor.

In the above, an example has been described in which the exercise necessity degree determination unit 13 determines the exercise necessity degree based on the activity amount being indicated in the activity amount information. Alternatively, the exercise necessity degree determination unit 13 may determine the exercise necessity degree, for example, based on a diagnosis by a doctor or the like, about the need for exercise for the elevator user.

*Description of Effect of Embodiment*

As described above, according to the present embodiment, it is possible to adjust the number of floors for which the stairs are used depending on the necessity degree of exercise of the elevator user.

Further, in the present embodiment, when the boarding floor and/or the alighting floor is changed by the elevator control apparatus 10, the elevator user can change the changed boarding floor and/or the changed alighting floor back to the floor that the elevator user prefers. Therefore, the elevator user can choose to use the elevator in such an occasion that he/she does not want to use the stairs for health reasons, that he/she does not want to use the stairs because he/she is in a hurry, that he/she does not want to use the stairs because he/she has luggage, or the like.

Second Embodiment

In the present embodiment, differences from the first embodiment will be mainly described.

Incidentally, matters that are not descried below are the same as those in the first embodiment.

In the present embodiment, an example will be described, in which the floor decision unit 14 decides the boarding floor and the alighting floor based on a record of the elevator user accepting the changed boarding floor and/or the changed alighting floor in the past.

*Description of Configuration*

Figure 8:
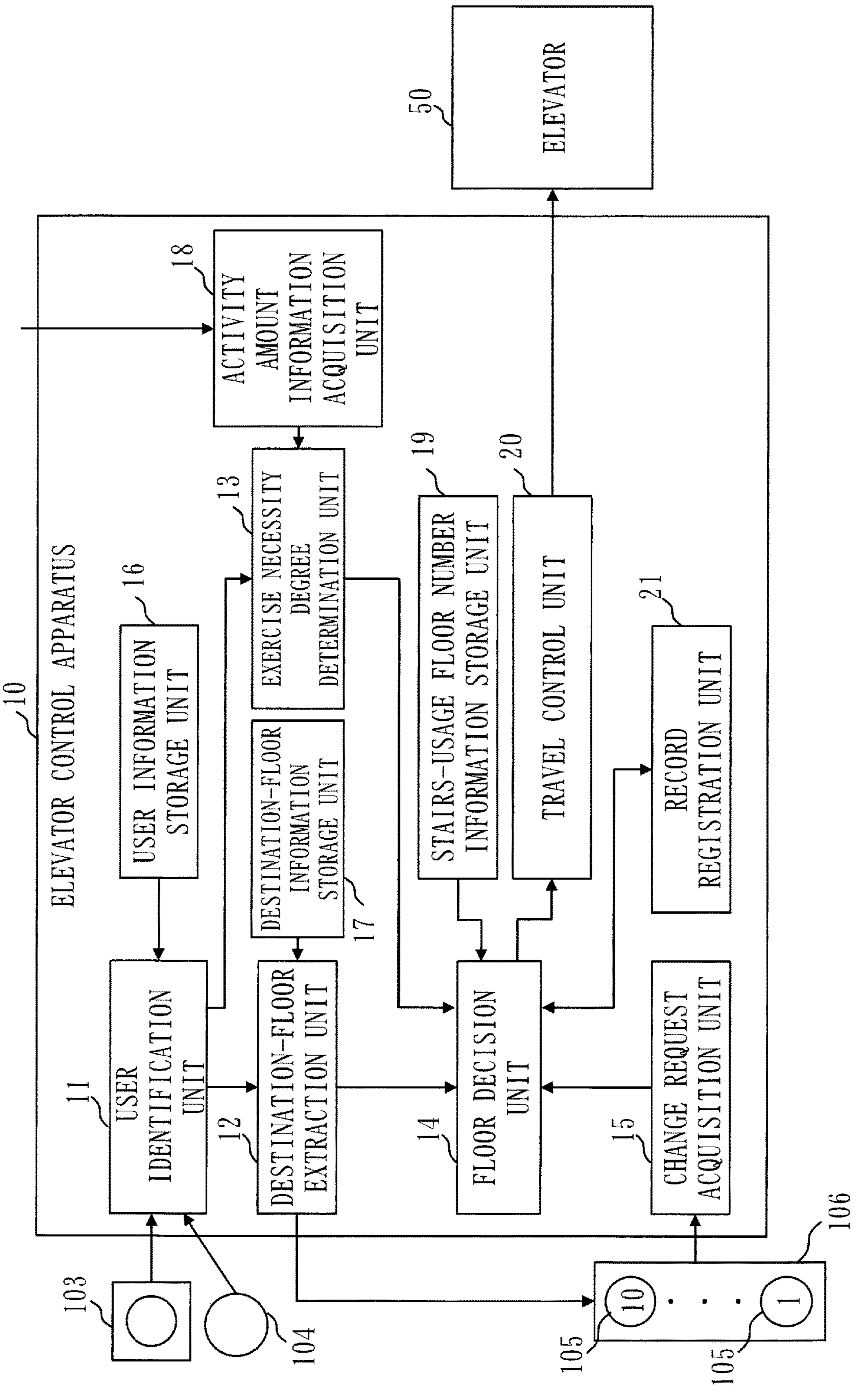
FIG. 8 is a diagram illustrating a functional configuration example of the elevator control apparatus according to a second embodiment.

FIG. 8 illustrates a functional configuration example of the elevator control apparatus 10 according to the present embodiment Compared with FIG. 3, a record registration unit 21 is added in the elevator control apparatus 10.

Note that, as with the user identification unit 11 and the like, the record registration unit 21 is also realized by a program. The program which realizes a function of the record registration unit 21 is executed by the processor 1001 as with the user identification unit 11 and the like.

The record registration unit 21 registers an acceptance record of the boarding floor and the alighting floor for each elevator user.

FIG. 9 illustrates an example of acceptance record information managed in the record registration unit 21.

The record registration unit 21 registers the number of times of approval, the number of times of disapproval, and the number of times of update for each combination of the boarding floor and the alighting floor as illustrated in FIG. 9. The example of FIG. 9 illustrates the acceptance record of the elevator user with a user ID: AAA.

The number of times of approval is the number of times that the elevator user has approved the combination of the boarding floor and the alighting floor decided by the floor decision unit 14 (the number of times that a change in the boarding floor and/or the alighting floor has not been requested).

The number of times of disapproval is the number of times that the elevator user has disapproved the combination of the boarding floor and the alighting floor decided by the floor decision unit 14 (the number of times that a change in the boarding floor and/or the alighting floor has been requested).

The number of times of update is the number of times that an update has been requested in the change request.

It is assumed that the on-board section of the elevator 50 for the user with the user ID: AAA is the first floor to the seventh floor.

In the example of FIG. 9, since the floor decision unit 14 has not proposed the combination of "boarding floor: 1F" and "alighting floor: 7F", the number of times of approval and the number of times of disapproval are both "0". On the other hand, the elevator user has requested ten times in the past to change from another combination to the combination of "boarding floor: 1F" and "alighting floor: 7F" and the number of times of update is "10". That is, although the floor decision unit 14 has proposed to use the stairs in the past, the user with the user ID: AAA has requested ten times to operate the elevator 50 with "boarding floor: 1F" and "alighting floor: 7F".

Since the elevator user has approved the combination of "boarding floor: 1F" and "alighting floor: 6F" five times in the past, the number of times of approval is "5". Further, since the elevator user has disapproved the combination of "boarding floor: 1F" and "alighting floor: 6F" three times in the past and has requested to change it to another combination, the number of times of disapproval is "3". Further, since the elevator user has requested twice to change from another combination to the combination of "boarding floor: 1F" and "alighting floor: 6F", the number of times of update is "2".

In the present embodiment, by referring to the acceptance record information exemplified in FIG. 9, the floor decision unit 14 decides the boarding floor and the alighting floor based on the acceptance record of the elevator user about the boarding floor and the alighting floor. For example, the floor decision unit 14 selects a combination of the boarding floor and the alighting floor for which the number of times of acceptance is equal to or greater than a threshold value. The number of times of acceptance is assumed to be obtained by (the number of times of approval+the number of times of update). Further, the floor decision unit 14 may select a combination of the boarding floor and the alighting floor for which an acceptance probability is equal to or greater than a threshold value. The acceptance probability is assumed to be obtained by (the number of times of acceptance/(the number of times of acceptance+the number of times of disapproval)).

*Description of Operation*

Figure 10:
FIG. 10 is a flowchart illustrating an operation example of the elevator control apparatus according to the second embodiment.

FIG. 10 illustrates an operation example of the elevator control apparatus 10 according to the present embodiment Since steps S401 to S404 are the same as those illustrated in FIG. 4, the descriptions will be omitted.

In step S421, the floor decision unit 14 determines whether or not there is the acceptance record information exemplified in FIG. 9 for the user identified in step S404.

When there is no acceptance record information, steps S405 to S408 are performed. FIG. 10 does not depict steps S405 to S408 for depiction convenience, however, "S405 to S408" in FIG. 10 means that steps S405 to S408 in FIG. 4 are performed.

On the other hand, when there is the acceptance record information, the process proceeds to step S422.

In step S422, the floor decision unit 14 decides the boarding floor and the alighting floor based on the acceptance record.

For example, the floor decision unit 14 selects a combination of the boarding floor and the alighting floor for which the number of times of acceptance is equal to or greater than a threshold value. When there is more than one combination for which the number of times of acceptance is equal to or greater than the threshold value, the floor decision unit 14 selects, for example, a combination for which the number of times of acceptance is highest. Alternatively, the floor decision unit 14 may select a combination with the highest stairs-usage floor number, from among combinations for which the number of times of acceptance is equal to or greater than the threshold value.

Alternatively, the floor decision unit 14 may select a combination of the boarding floor and the alighting floor for which the acceptance probability is equal to or greater than a threshold value. When there is more than one combination of the boarding floor and the alighting floor for which the acceptance probability is equal to or greater than the threshold value, the floor decision unit 14 selects, for example, a combination for which the acceptance probability is highest. Alternatively, the floor decision unit 14 may select a combination with the highest stairs-usage floor number, from among combinations for which the acceptance probability is equal to or greater than the threshold value.

Then, the floor decision unit 14 notifies the elevator user of the boarding floor and the alighting floor by lighting up the floor display 105 corresponding to the decided boarding floor and alighting floor in the same way as the first embodiment.

Since step S409 and step S410 are the same as those illustrated in FIG. 4, the descriptions will be omitted.

In step S423, the record registration unit 21 registers record information.

Specifically, the floor decision unit 14 notifies the record registration unit 21 of the boarding floor and the alighting floor decided in step S408 or step S422. Further, when the boarding floor and/or the alighting floor has been updated in step S410, the floor decision unit 14 notifies the record registration unit 21 of the eventual boarding floor and/or alighting floor.

Further, the floor decision unit 14 also notifies the record registration unit 21 of the user ID of the corresponding elevator user.

The record registration unit 21 updates for the user ID notified of by the floor decision unit 14, the number of times of approval, the number of times of disapproval, and the number of times of update in the record information exemplified in FIG. 9, in response to the combination of the boarding floor and the alighting floor notified of by the floor decision unit 14. Then, the updated record information is registered.

Since step S411 is the same as that illustrated in FIG. 4, the descriptions will be omitted.

*Description of Effect of Embodiment*

In the present embodiment, it is possible to propose to the elevator user the combination of the boarding floor and the alighting floor that is easily accepted by the elevator user because the boarding floor and the alighting floor are decided based on the acceptance record. As a result, it is possible to avoid offending the elevator user by proposing the use of stairs that is difficult for the elevator user to accept.

Further, by proposing to the elevator user a combination of the boarding floor and the alighting floor that is easy for the elevator user to accept, the elevator user does not have to perform any operation for the change request.

Further, by recording the acceptance record, it is possible to grasp an appropriate load (the stairs-usage floor number) for the elevator user.

Further, in addition to the above, the floor decision unit 14 may select a floor to which the floor that the elevator user prefers is changed, while giving priority to a record closer to the present in terms of a time axis among at least either of records of the elevator user accepting in the past and records of the elevator user not accepting in the past. For example, the floor decision unit 14 records a history of date and time of acceptance for each combination of the boarding floor and the alighting floor and multiplies the acceptance probability by a coefficient inversely proportional to the elapsed time up to the present. Thereby, the floor decision unit 14 weights the acceptance probability of the most recently accepted combination of the boarding floor and the alighting floor so as to relatively enlarge the acceptance probability of the most recently accepted combination of the boarding floor and the alighting floor. The floor decision unit 14 may perform such weighting for the acceptance probability depending on a time range of a day, a day of the week, or a season. Further, it is acceptable that the floor decision unit 14 does not refer to the record with the elapsed time up to the present being above a certain time so as not to refer to records older than a certain time.

Further, the floor decision unit 14 may choose a floor to which the floor that the elevator user prefers is changed, based on the record that the elevator user has accepted at least one of the changed boarding floor and the changed alighting floor and based on the number of floors for which the inter-floor travel means has been used with the changed boarding floor and the number of floors for which the inter-floor travel means has been used with the changed alighting floor. For example, the floor decision unit 14 selects a combination of the boarding floor and the alighting floor for which an expected value is equal to or greater than a threshold value, the expected value being obtained by multiplying the acceptance probability by the number of floors used.

The first and second embodiments have been described above, and these two embodiments may be implemented in combination.

Alternatively, one of these two embodiments may be partially implemented.

Alternatively, these two embodiments may be partially implemented in combination.

Further, the configurations and procedures described in these two embodiments may be modified as necessary.

For a user who has difficulty using the inter-floor travel means other than the elevator, an attribute (for example, wheelchair) is registered in the user information. Then, such an elevator user may always be able to go to the floor that the elevator user prefers by identify the elevator user, by setting the exercise necessity degree of the elevator user to 0 all the time, or the like. For example, it is conceivable that the exercise necessity degree is always determined to be 0 by setting the target value of the activity amount to 0.

*Supplementary Description of Hardware Configuration*

Finally, a supplementary description of the hardware configuration of the elevator control apparatus 10 will be given.

The processor 1001 illustrated in FIG. 2 is an IC (Integrated Circuit) that performs processing.

The processor 1001 is a CPU (Central Processing Unit), a DSP (Digital Signal Processor), or the like.

The main storage device 1002 illustrated in FIG. 2 is a RAM (Random Access Memory).

The auxiliary storage device 1003 illustrated in FIG. 2 is a ROM (Read Only Memory), a flash memory, an HDD (Hard Disk Drive), or the like.

The communication device 1004 illustrated in FIG. 2 is an electronic circuit that executes a communication process for data.

The communication device 1004 is, for example, a communication chip or an NIC (Network Interface Card).

Further, the auxiliary storage device 1003 also stores an OS (Operating System).

Then, at least a part of the OS is executed by the processor 1001.

While executing at least the part of the OS, the processor 1001 executes the programs which realize the functions of the user identification unit 11, the destination-floor extraction unit 12, the exercise necessity degree determination unit 13, the floor decision unit 14, the change request acquisition unit 15, the activity amount information acquisition unit 18, the travel control unit 20, and the record registration unit 21.

By the processor 1001 executing the OS, task management, memory management, file management, communication control, and the like are performed.

Further, at least one of information, data, a signal vale, and a variable value that indicate results of processes of the user identification unit 11, the destination-floor extraction unit 12, the exercise necessity degree determination unit 13, the floor decision unit 14, the change request acquisition unit 15, the activity amount information acquisition unit 18, the travel control unit 20, and the record registration unit 21 is stored in at least one of the main storage device 1002, the auxiliary storage device 1003, and a register and a cache memory in the processor 1001.

Further, the programs which realize the functions of the user identification unit 11, the destination-floor extraction unit 12, the exercise necessity degree determination unit 13, the floor decision unit 14, the change request acquisition unit 15, the activity amount information acquisition unit 18, the travel control unit 20, and the record registration unit 21 may be stored in a portable recording medium such as a magnetic disk, a flexible disk, an optical disc, a compact disc, a Blu-ray (registered trademark) disc, a DVD. Then, the portable recording medium storing the program which realize the functions of the user identification unit 11, the destination-floor extraction unit 12, the exercise necessity degree determination unit 13, the floor decision unit 14, the change request acquisition unit 15, the activity amount information acquisition unit 18, the travel control unit 20, and the record registration unit 21 may be distributed.

Further, the "unit" of each of the user identification unit 11, the destination-floor extraction unit 12, the exercise necessity degree determination unit 13, the floor decision unit 14, the change request acquisition unit 15, the activity amount information acquisition unit 18, the travel control unit 20, and the record registration unit 21 may be read as a "circuit", "step", "procedure", or "process".

Further, the elevator control apparatus 10 may be realized by a processing circuit. The processing circuit is, for example, a logic IC (Integrated Circuit), a GA (Gate Array), an ASIC (Application Specific Integrated Circuit), or an FPGA (Field-Programmable Gate Array).

Note that, in the present specification, a superordinate concept of the processor and the processing circuit is referred to as "processing circuitry".

That is, each of the processor and the processing circuit is a specific example of the "processing circuitry".

REFERENCE SIGNS LIST

10: elevator control apparatus; 11: user identification unit; 12: destination-floor extraction unit; 13: exercise necessity degree determination unit; 14: floor decision unit; 15: change request acquisition unit; 16: user information storage unit; 17: destination-floor information storage unit; 18: activity amount information acquisition unit; 19: stairs-usage floor number information storage unit; 20: travel control unit; 21: record registration unit; 50: elevator; 101: door; 102: stairs; 103: surveillance camera; 104: beacon; 105: floor display; 106: information board; 601: door; 602: stairs; 603: surveillance camera; 604: beacon; 701: door; 702: stairs; 703: surveillance camera; 704: beacon; 901: door; 902: stairs; 903: surveillance camera; 904: beacon; 1001: processor; 1002: main storage device; 1003: auxiliary storage device; 1004: communication device

The invention claimed is:

1. An elevator control apparatus comprising:

processing circuitry to:

determine an exercise necessity degree being a degree to which an elevator user needs to exercise, who uses an elevator provided in a building provided with an inter-floor travel means other than the elevator; and change based on the exercise necessity degree of the elevator user determined, at least one of a boarding floor and an alighting floor of the elevator from a floor that the elevator user prefers to another floor so as to let the elevator user use the inter-floor travel means before the elevator user reaches a destination floor to which the elevator user intends to go, wherein when the elevator user requests to change at least one of a changed boarding floor and a changed alighting floor to a floor that the elevator user prefers, the processing circuitry changes at least one of the changed boarding floor and the changed alighting floor to the floor that the elevator user prefers, the processing circuitry decides whether or not to change based on at least one of a record of the elevator user accepting at least one of the changed boarding floor and the changed alighting floor and a record of the elevator user not accepting at least one of the changed boarding floor and the changed alighting floor, at least one of the boarding floor and the alighting floor of the elevator from the floor that the elevator user prefers to the another floor, and the processing circuitry selects a floor to which the floor that the elevator user prefers is changed, based on a record that the elevator user has accepted at least one of the changed boarding floor and the changed alighting floor and based on the number of floors for which the inter-floor travel means has been used with the changed boarding floor and the number of floors for which the inter-floor travel means has been used with the changed alighting floor.

2. The elevator control apparatus according to claim 1, wherein the processing circuitry changes at least one of the boarding floor and the alighting floor of the elevator to at least one of the changed boarding floor and the changed alighting floor that the elevator user has accepted in a past the number of times equal to or greater than a threshold value.

3. The elevator control apparatus according to claim 1, wherein the processing circuitry changes at least one of the boarding floor and the alighting floor of the elevator to at least one of the changed boarding floor and the changed alighting floor that the elevator user has not accepted in a past the number of times equal to or less than a threshold value.

4. The elevator control apparatus according to claim 1, wherein the processing circuitry changes at least one of the boarding floor and the alighting floor of the elevator to at least one of the changed boarding floor and the changed alighting floor that the elevator user has accepted in a past with a probability equal to or greater than a threshold value.

5. The elevator control apparatus according to claim 1, wherein the processing circuitry selects a floor to which the floor that the elevator user prefers is changed, while giving priority to a record closer to the present in terms of a time axis among at least either of records of the elevator user accepting in a past and records of the elevator user not accepting in the past.

6. The elevator control apparatus according to claim 1, wherein the processing circuitry changes at least one of the boarding floor and the alighting floor of the elevator from the floor that the elevator user prefers to the another floor so as to let the elevator user with a higher exercise necessity degree use the inter-floor travel means more.

7. The elevator control apparatus according to claim 1, wherein the processing circuitry determines the exercise necessity degree based on an activity amount of the elevator user.

8. An elevator control method comprising:

determining an exercise necessity degree being a degree to which an elevator user needs to exercise, who uses an elevator provided in a building provided with an inter-floor travel means other than the elevator, and changing based on the determined exercise necessity degree of the elevator user, at least one of a boarding floor and an alighting floor of the elevator from a floor that the elevator user prefers to another floor so as to let the elevator user use the inter-floor travel means before the elevator user reaches a destination floor to which the elevator user intends to go, wherein when the elevator user requests to change at least one of a changed boarding floor and a changed alighting floor to a floor that the elevator user prefers, the elevator control method further comprises changing at least one of the changed boarding floor and the changed alighting floor to the floor that the elevator user prefers, the elevator control method further comprises deciding whether or not to change based on at least one of a record of the elevator user accepting at least one of the changed boarding floor and the changed alighting floor and a record of the elevator user not accepting at least one of the changed boarding floor and the changed alighting floor, at least one of the boarding floor and the alighting floor of the elevator from the floor that the elevator user prefers to the another floor, and selecting a floor to which the floor that the elevator user prefers is changed, based on a record that the elevator user has accepted at least one of the changed boarding floor and the changed alighting floor and based on the number of floors for which the inter-floor travel means has been used with the changed boarding floor and the number of floors for which the inter-floor travel means has been used with the changed alighting floor.

9. A non-transitory computer readable medium storing an elevator control program for causing a computer to execute:

an exercise necessity degree determination process to determine an exercise necessity degree being a degree to which an elevator user needs to exercise, who uses an elevator provided in a building provided with an inter-floor travel means other than the elevator; and a floor decision process to change based on the exercise necessity degree of the elevator user determined by the exercise necessity degree determination process, at least one of a boarding floor and an alighting floor of the elevator from a floor that the elevator user prefers to another floor so as to let the elevator user use the inter-floor travel means before the elevator user reaches a destination floor to which the elevator user intends to go, wherein when the elevator user requests to change at least one of a changed boarding floor and a changed alighting floor to a floor that the elevator user prefers, the elevator control program causes the computer to further execute the floor decision process to change at least one of the changed boarding floor and the changed alighting floor to the floor that the elevator user prefers, the elevator control program causes the computer to further execute the floor decision process to decide whether or not to change based on at least one of a record of the elevator user accepting at least one of the changed boarding floor and the changed alighting floor and a record of the elevator user not accepting at least one of the changed boarding floor and the changed alighting floor, at least one of the boarding floor and the alighting floor of the elevator from the floor that the elevator user prefers to the another floor, and to select a floor to which the floor that the elevator user prefers is changed, based on a record that the elevator user has accepted at least one of the changed boarding floor and the changed alighting floor and based on the number of floors for which the inter-floor travel means has been used with the changed boarding floor and the number of floors for which the inter-floor travel means has been used with the changed alighting floor.

* * * * *